Lyon & Brady,
Turning Bungs.

N° 22,101. Patented Nov. 16, 1858.

Witnesses

Inventors
James Lyon
Geo. H. Brady

AM. PHOTO-LITHO. CO. N.Y. (OSBORNE'S PROCESS)

UNITED STATES PATENT OFFICE.

JAMES LYON AND GEO. H. BRADY, OF NEW YORK, N. Y., ASSIGNORS TO THEMSELVES AND THO. J. FALLS, JR., OF SAME PLACE.

MACHINE FOR CUTTING BUNGS.

Specification of Letters Patent No. 22,101, dated November 16, 1858.

*To all whom it may concern:*

Be it known that we, JAMES LYON and GEORGE H. BRADY, of the city and State of New York, have invented, made, and applied to use certain new and useful Improvements in Machinery for Cutting Bungs and Similar Articles; and we do hereby declare that the following is a full, clear, and exact description of the construction and operation of the same, reference being had to the annexed drawing, making part of this specification, wherein—

Figure 1:
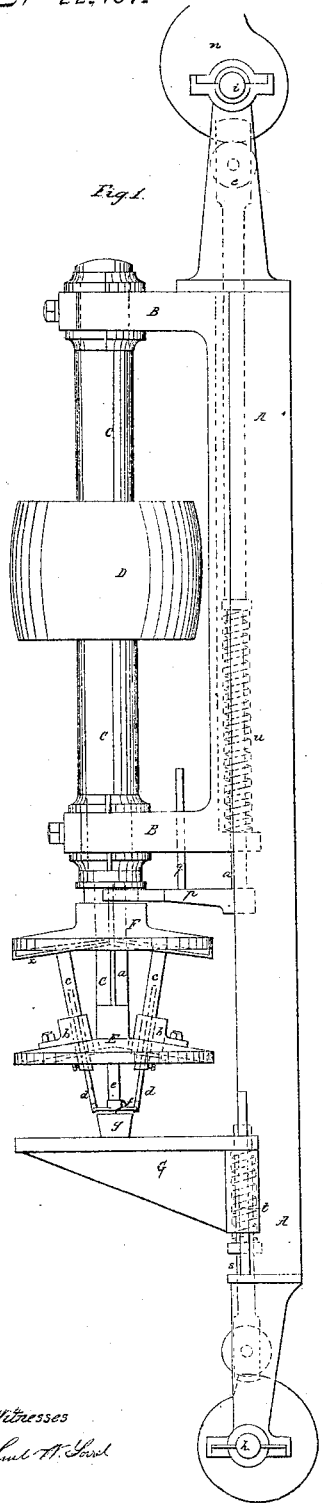
Figure 2:
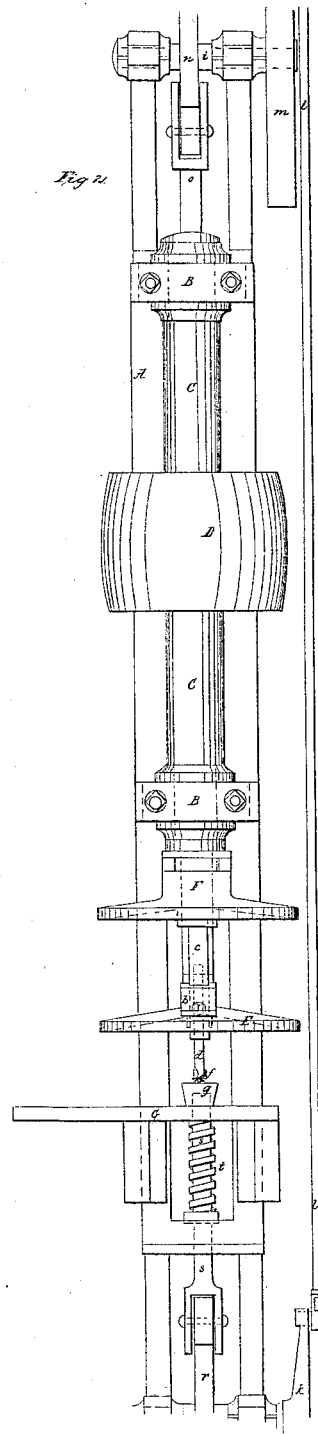
Figure 3:
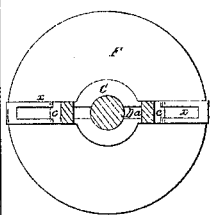
Figure 4:
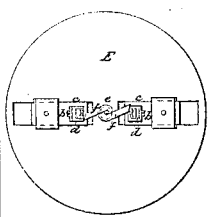

Figure 1, is a side elevation and Fig. 2, is a front view of our said machine. Fig. 3, is a view of the face plate that moves the tools, and Fig. 4, is a face view of the chuck and tool stocks.

Similar letters denote the same parts.

The nature of our said invention consists of a revolving face chuck carrying adjustable stocks through which cutters are slid and forced down onto the article to be cut, or withdrawn therefrom by means of a face plate acting on the ends of said cutters. We also make use of a revolving cutter to finish off the outer end of the bung.

In the drawing A, is a frame which may be sustained in a vertical or horizontal position by suitable means, but we prefer the former position; on this frame boxes B, B, are provided that sustain the vertical shaft C, which is to be revolved when in use by the pulley D.

On the lower end of the shaft C, a face plate or chuck E, is attached, and for forming bungs the surface of this chuck is beveling or conical, at an angle the reverse of that given to the beveled sides of the bung. This chuck is provided with radial slots receiving the slides $b$, $b$, which carry the stocks $c$ $c$ of the cutters $d$, $d$. These stocks are adjustable so as to vary the size of the bung produced by forcing said cutters $d$, $d$, into a plank or other piece of wood resting on the bed G. In order to slide the cutter stocks $c$, $c$, through their slides $b$, $b$, and cause the cutters to penetrate and cut as they are revolved by the chuck E, we provide a face plate F, that is fitted to slide on a feather $a$, on the shaft C, and this face plate F is provided with cross slides $x$, that receive the notched heads of the cutter stocks $c$, $c$, so that said cutters $d$, $d$ are both forced down and withdrawn by the motion of said face plate, and the convergence of said cutters is allowed for by the sliding of said cutter heads in the slides $x$, $x$. To give motion to this face plate F, we provide a fork $p$, on the rod $o$, that receives motion from the cam $n$, that is revolved by the shaft $i$ and wheel $m$; $q$ is a guide rod and $u$ is a spring keeping the roller on the end of rod $o$, against cam $n$, and also drawing the cutters back when the cam $n$, permits thereof.

The bed G is to receive a motion sufficient for entering and withdrawing the piece of wood to be operated on, and for this purpose any suitable means may be employed; we however have shown a cam $r$ which acting on a roller and rod $s$ communicates the necessary motion to said bed G,—the spring $t$, being used to compensate for any difference in thickness, and to keep the wood up to the revolving tool $f$ that sets on the spindle $e$, at the end of the shaft C. This facing tool $f$ is provided with a conical center point which acts to steady the material while being operated on. The cam $r$ is affixed on the shaft $h$, and may receive a motion from the wheel $m$, by the rod $l$, and crank $k$.

It will be apparent that this apparatus might be used for cutting bung holes in barrels, although primarily adapted to forming bungs; and also that the angle at which the tools cut the sides of the bung or plug, may be varied according to the inclination of the cutter $d$, and stock $c$.

What we claim and desire to secure by Letters Patent is—

The cutters $d$, $d$, and stocks $c$, $c$, sliding in the adjustable blocks $b$, $b$, that are revolved by the face plate E, and which cutters $d$, $d$, are projected by means of the disk F and act to cut a tapering bung substantially as specified.

In witness whereof we have hereunto set our signatures this fifteenth day of October 1858.

JAMES LYON.
GEO. H. BRADY.

Witnesses:
LEMUEL W. SERRELL,
THOMAS G. HAROLD.